United States Patent
Hsieh

(10) Patent No.: US 6,593,701 B1
(45) Date of Patent: Jul. 15, 2003

(54) DECORATIVE LAMP

(76) Inventor: Chin-Mu Hsieh, No. 5, Lane 93, Kungyuan Rd., Yungkang City, Tainan Hsien (TW)

( * ) Notice: Subject to any disclaimer, the term of this patent is extended or adjusted under 35 U.S.C. 154(b) by 0 days.

(21) Appl. No.: 10/127,437

(22) Filed: Apr. 23, 2002

(51) Int. Cl.$^7$ ............................................... H05B 37/00
(52) U.S. Cl. ...................................... 315/159; 362/183
(58) Field of Search ................................ 315/158, 159; 362/183

(56) References Cited

U.S. PATENT DOCUMENTS 6,013,985 A * 1/2000 Green et al. ................. 315/149

* cited by examiner

*Primary Examiner*—David Vu
(74) *Attorney, Agent, or Firm*—Rosenberg, Klein & Lee

(57) ABSTRACT

A decorative lamp has a casing with a pervious to light plate, a light source and a control circuit having a power unit, a light detecting unit and an electronic switch. The power unit has at lease one solar battery and at least one rechargeable battery. The light detecting unit is able to detect changes in the level of ambient light around the casing to turn on or turn off the signal amplifier unit and the electronic switch. Therefore the lamp automatically turns on and does not need to be connected to external power.

11 Claims, 6 Drawing Sheets

DECORATIVE LAMP

BACKGROUND OF THE INVENTION

1. Field of the Invention

The present invention relates to a decorative lamp for outdoor walls or outdoor floors of a building, and more particularly to a decorative lamp with a control circuit having a power unit and a light detecting unit to automatically to turn on/off a light source. The power unit is comprised of a solar battery and a rechargeable battery, so that the power unit provides DC power to the light detecting unit and the light source.

2. Description of Related Art

Lamps or lights are installed around buildings or open areas to light up dark places at night. Lamps are not only used to light dark places but also are used to decorate buildings. However, before installing lamps in walls or floors, recesses are defined in the walls or floors to mount the lamps. Furthermore, power lines must be run to the recesses to provide power to the lamp such that users have to throw a power switch to turn on the lamps.

Conventional lamps use light bulbs as light sources, but light bulbs use higher voltage power and have a relatively short life before they must be replaced.

To overcome the shortcomings, the present invention provides an improved decorative lamp having a brick shaped casing and a control circuit to mitigate and obviate the aforementioned problems.

SUMMARY OF THE INVENTION

The main objective of the invention is to provide a decorative lamp that will automatically turns on a light source at night and does not connect to an external power.

Another objective is to have the decorative lamp operate on low voltage power by using LEDs as the light source.

Another objective is to have the decorative lamp be a shape that can be easily used with walls or floors.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
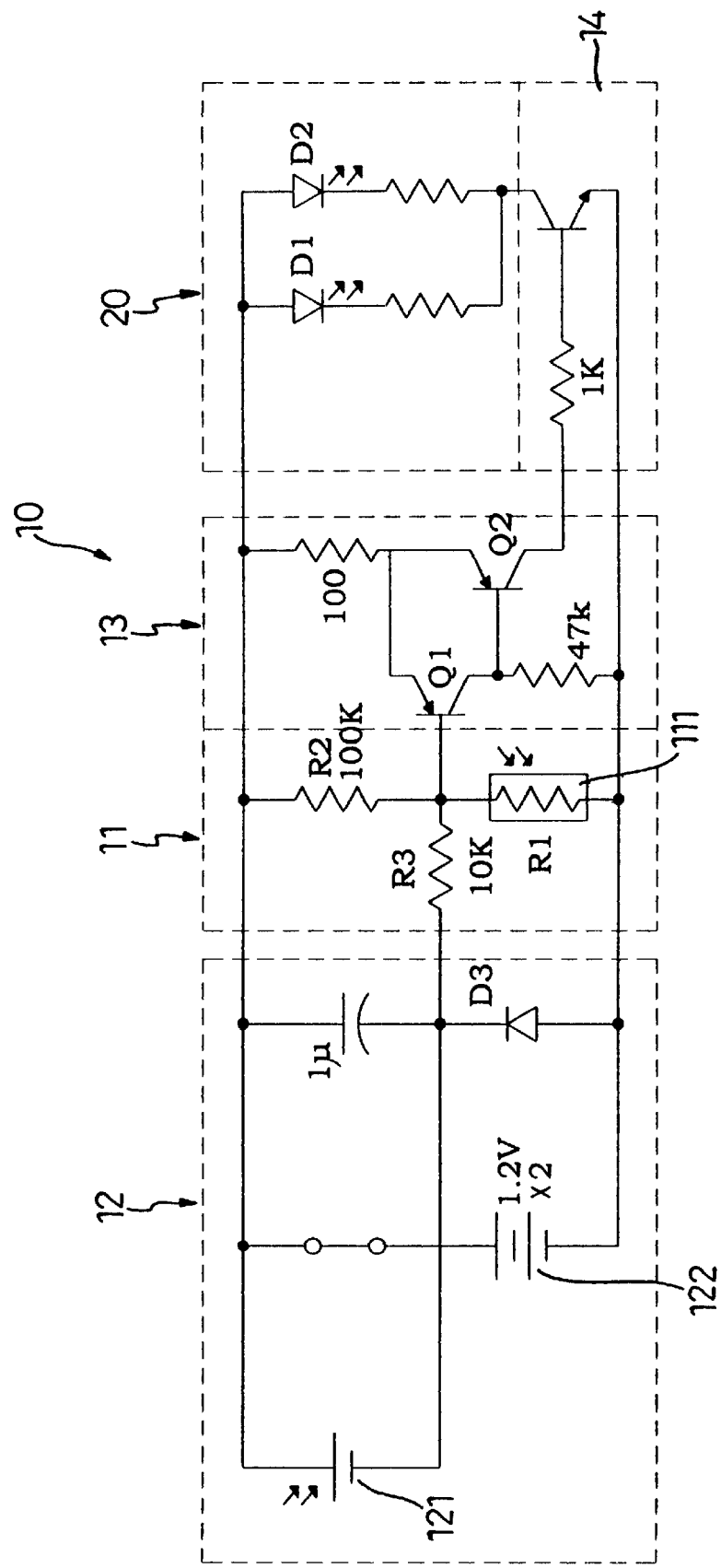
FIG. 1 is a circuit diagram of a first embodiment of a control circuit and light source for a decorative lamp in accordance with the present invention.

With reference to the drawings, a decorative lamp in accordance with the present invention is used in walls or floors to light areas at night. The decorative lamp has a hollow casing (15), a light source (20) mounted in the casing (15) and a control circuit (10) connected to the light source (20). The control circuit (10) is able to automatically turn on/off a light source (20) and does not use exterior power to operate. With reference to FIGS. 1 to 4, the control circuit (10) comprises a power unit (12), a light detecting unit (11), a signal amplifier unit (13), an electronic switch (14) and alternately a voltage booster (17). The light source (20) may be implemented as a parallel connection of LEDs having two nodes or a single LED. Except where a voltage booster (17) is used, at least one of two nodes of the light source (20) is connected to an electronic switch (14). With reference to FIG. 1, the electronic switch (14) in the first embodiment of the control circuit (10) is an NPN transistor.

Again with reference to FIGS. 1 to 4, the power unit (12) has at least one solar battery (121) and a rechargeable battery (122). The solar battery (121) outputs DC current to recharge the rechargeable battery (122). The rechargeable battery (122) is connected to the other node of the source light (20). Therefore the light source (20) does not need to be connected to an external power source.

The light detecting unit (11) is connected to the power unit (12). The light detecting unit (11) is a voltage divider and is comprised of a photo-resistor (111) and resister (R2) are connected in series. The photo-resistor (111) is exposed to ambient light outside the casing. When the brightness decreases, the resistance of the photo-resistor (111) increases.

The signal amplifier unit (13) has one input terminal from the light detecting unit (11) and one output terminal connected to the electronic switch (14) to turn on/off the light source (20). The signal amplifier unit (13) is a schmitter trigger composed of two PNP transistors (Q1, Q2). A base terminal of the transistor (Q1) is connected to a series node between the resistor (R2) and the photo-resistor (111). Transistor (Q2) has a collector terminal connected to the electronic switch (14).

When the lamp is mounted in an outdoor wall, the solar battery (121) recharges the rechargeable battery (122) during the daytime. Because the lamp is exposed to ambient light, the photo-resistor (111) has low resistance. Therefore the light source (20) does not light up. On the other hand, the rechargeable battery (122) provides DC power to the light detecting Unit (11), the signal amplifier (13) and the light source (20) at night. The photo-resistor (111) has higher resistance so the signal amplifier unit (13) has enough driving voltage to turn on and cause the electronic switch (14) to turn on and make the light source (20) light up. Therefore, the lamp with the control circuit (10) is able to operate automatically to turn on the light source (20) in a dark place.

Figure 2:
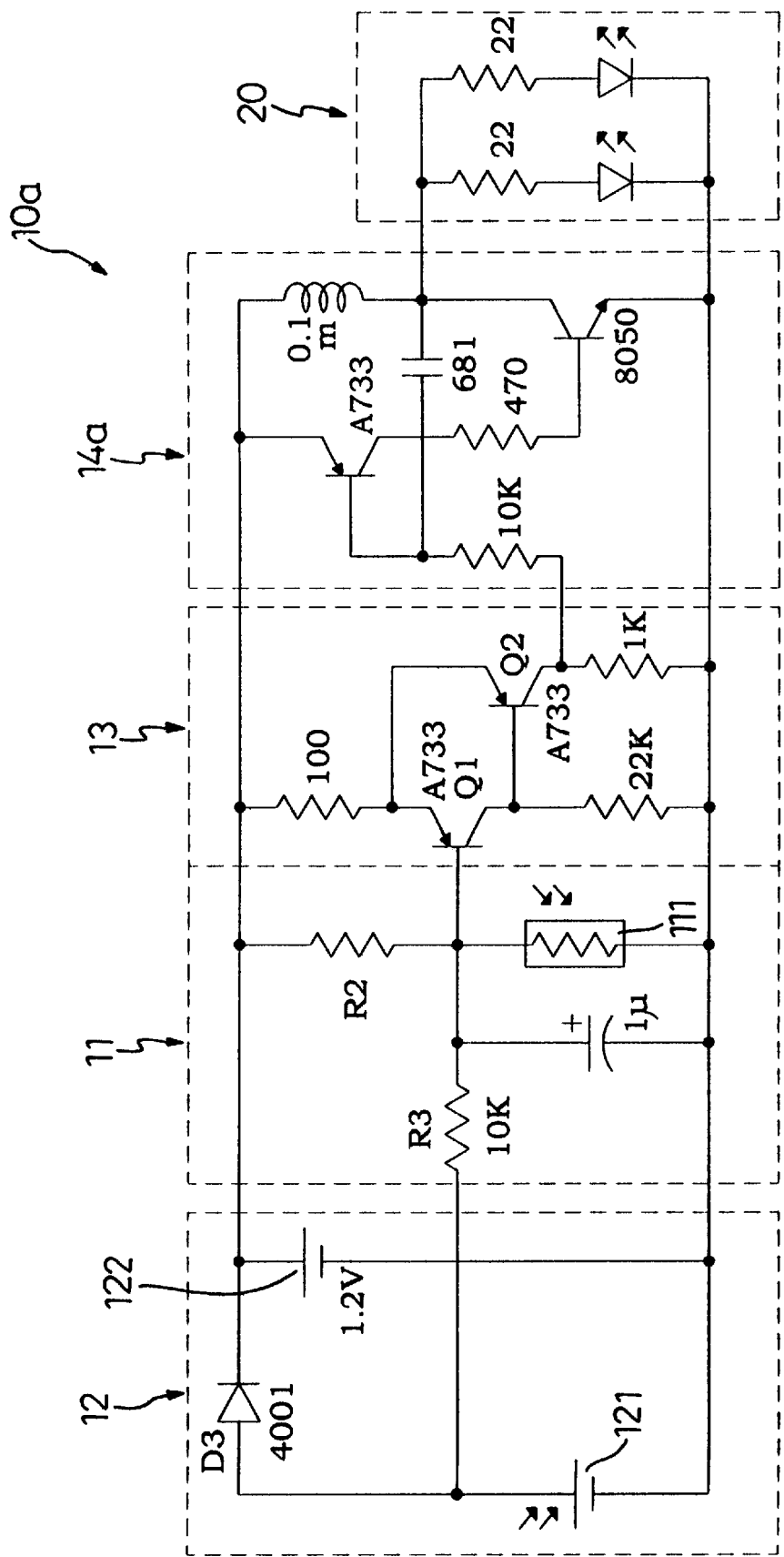
FIG. 2 is a circuit diagram of a second embodiment of a control circuit and light source for a decorative lamp in accordance with the present invention.

With reference to FIG. 2, a second embodiment of the control circuit (10a) has one difference from the first embodiment of a control circuit (10a), that is the electronic switch (14) in the first embodiment is an oscillating electronic switch (14a) that is a self-trigger oscillator. The oscillating electronic switch (14a) is connected the light source (20) with the signal amplifier (13), so that the oscillating electronic switch (14a) is driven by the signal amplifier unit (13) and outputs a wave signal to the light source (20).

Figure 3:
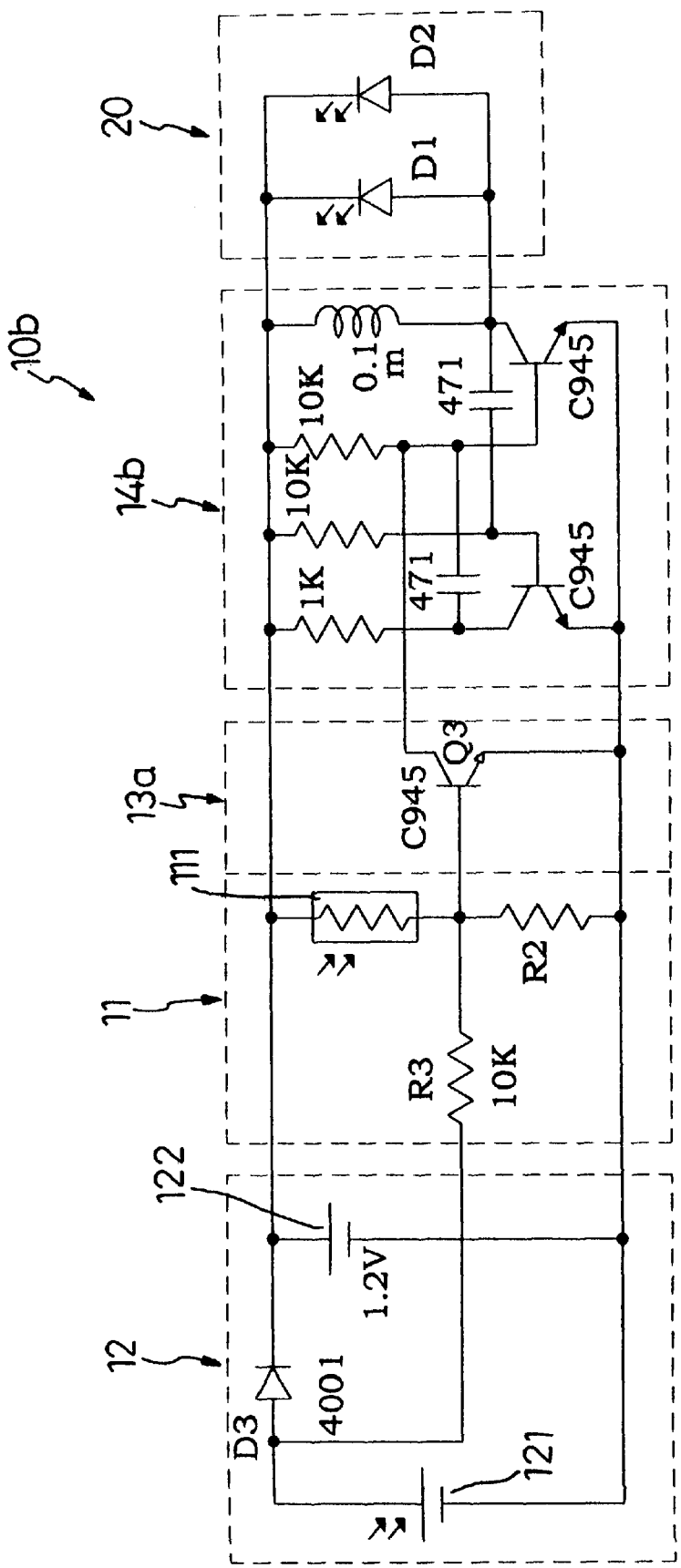
FIG. 3 is a circuit diagram of a third embodiment of a control circuit and light source for a decorative lamp in accordance with the present invention.

With reference to FIG. 3, a third embodiment of the control circuit (10b) has a number of differences from the second embodiment. The signal amplifier unit (13) is an NPN transistor (Q3), and the oscillating electronic switch (14b) is a unstable oscillator. Further, the position of the resistor (R2) and the photo-resistor (111) in the light detecting unit (11) are exchanged to drive the signal amplifier unit (13a).

Figure 4:
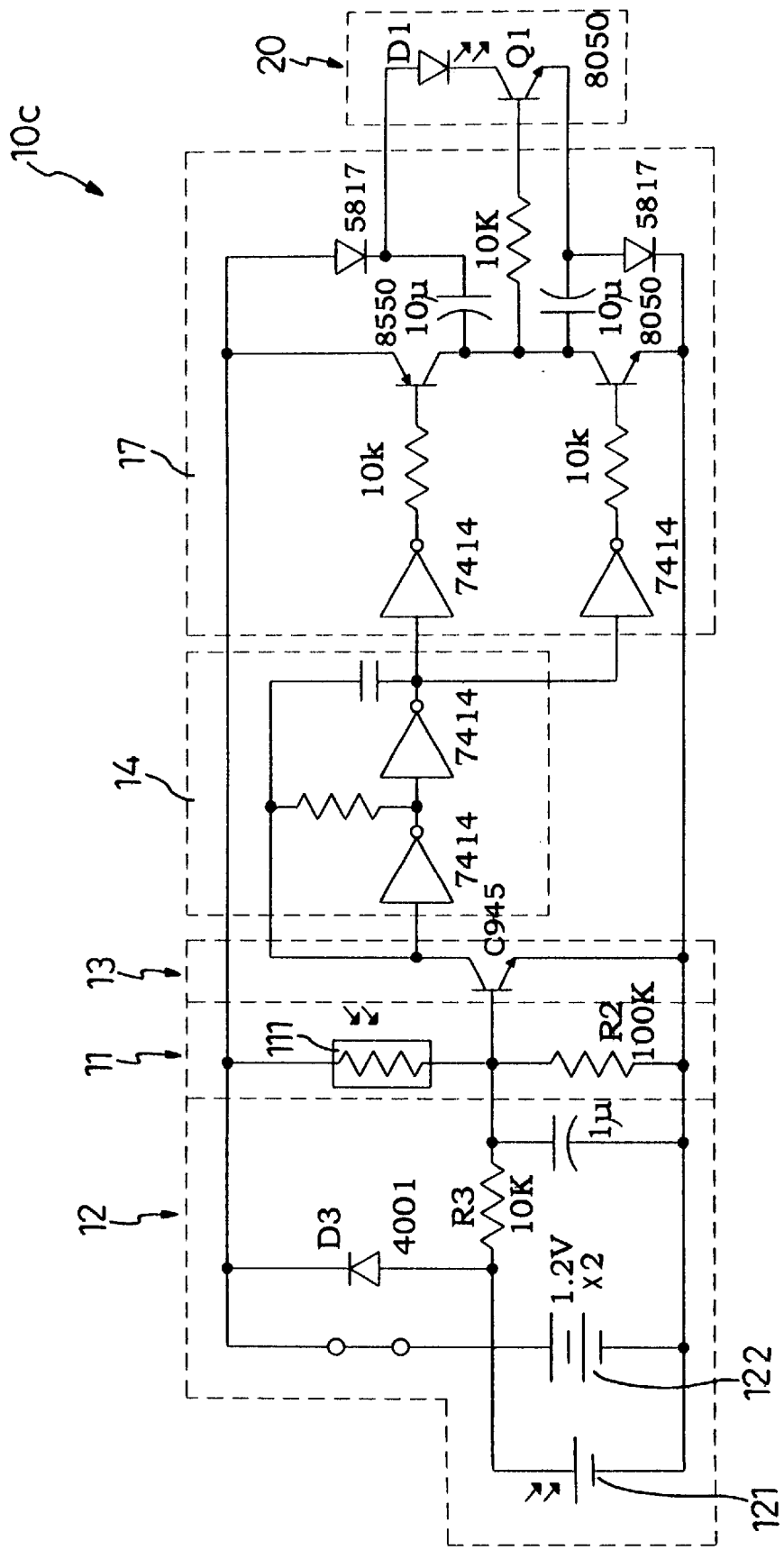
FIG. 4 is a circuit diagram of a fourth embodiment of a control circuit and light source for a decorative lamp in accordance with the present invention.

With reference to FIG. 4, a fourth embodiment of the control circuit (10c) is similar to the third embodiment. However, the control circuit (10c) further comprises a voltage booster (17) and connected the oscillating unit (14) with the light source (20). When the wave signal from the oscillating unit (14) is output to the voltage booster (17), the voltage booster (17) outputs enough power to drive the light source (20).

Figure 5:
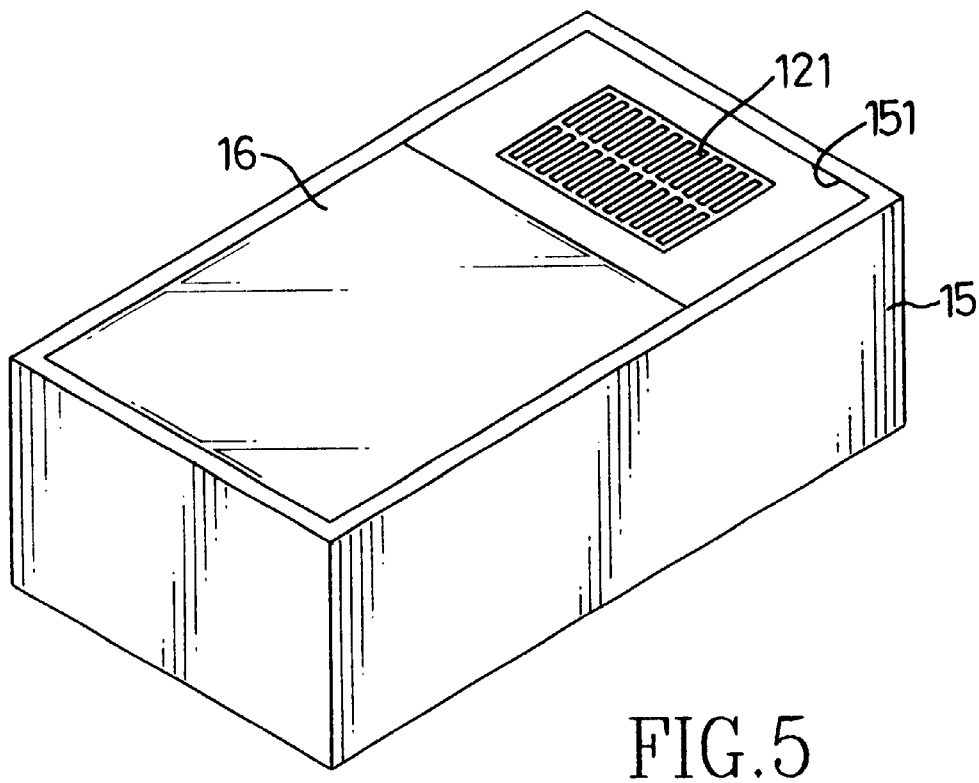
FIG. 5 is a perspective view of a first embodiment of a decorative lamp with a brick shape in accordance with the present invention.
Figure 6:
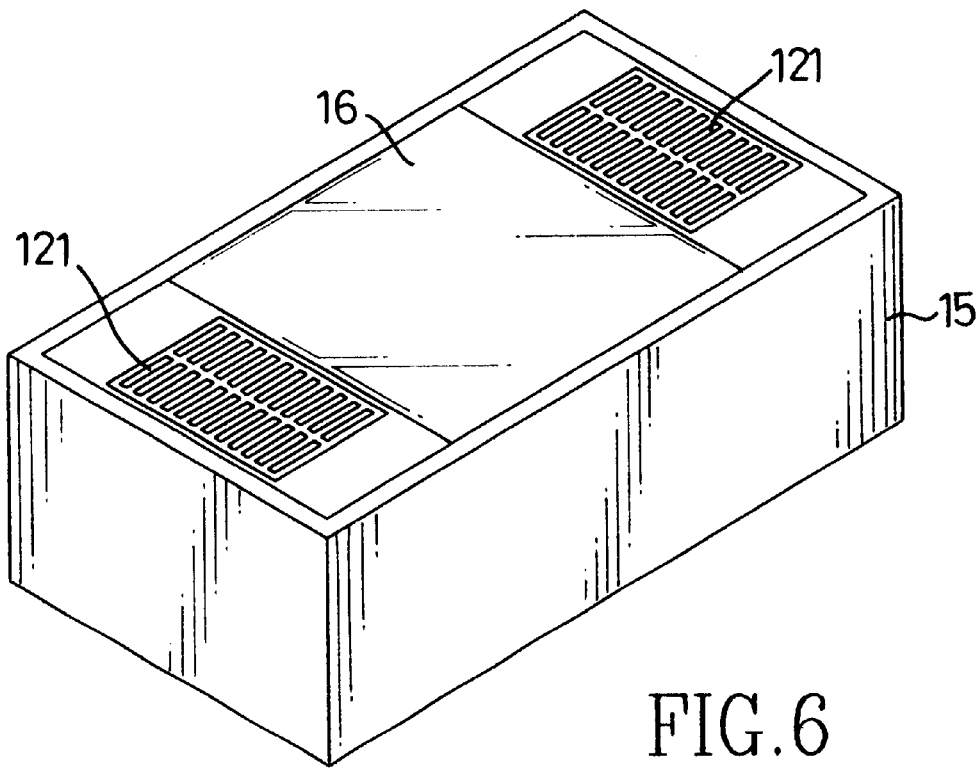
FIG. 6 is a perspective view of a second embodiment of a decorative lamp with a brick shape in accordance with the present invention.

With reference to FIG. 5, the first embodiment of the lamp comprises a hollow casing (15) having a top face and four sides, a pervious to light plate (16), a light source (not shown) corresponding to the pervious to light plate (16) and the control circuit (not shown). A top opening (151) is defined in the top face of the casing (15). The solar battery (121) and the pervious to light plate (16) cover the top opening (151). The casing (15) is a brick shape, so that the lamp easily mounts in walls or floors. The lamp is able to use two solar batteries (121), as shown in FIG. 6.

Figure 7:
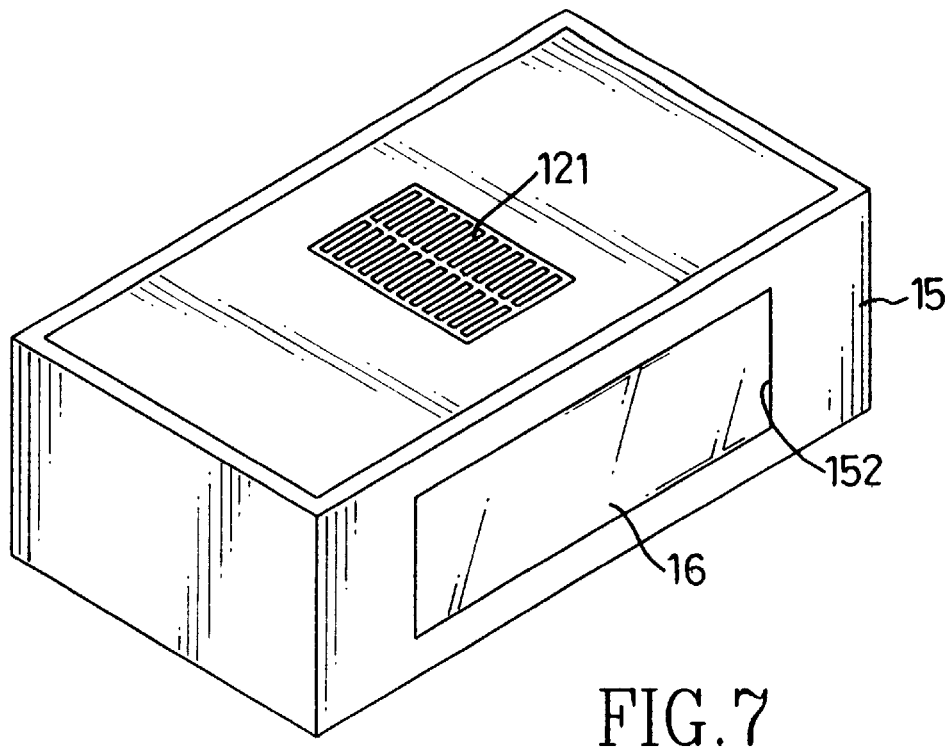
FIG. 7 is a perspective view of a third embodiment of a decorative lamp with a brick shape in accordance with the present invention.

With reference to FIG. 7, an opening (152) defined on one side of the casing (15) is covered by the pervious to light plate (16). Because the light source (not shown) faces the pervious to light plate (16), the light passes through from the side of the casing (15). Therefore, the light direction of the light is able to be changed.

Figure 8:
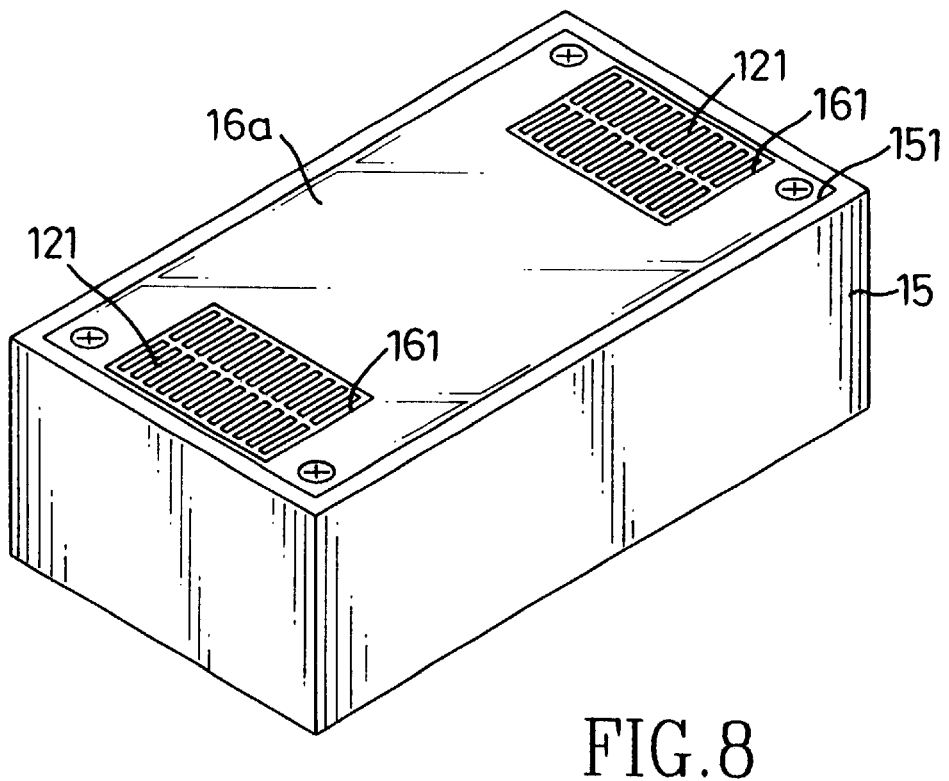
FIG. 8 is a perspective view of a fourth embodiment of a decorative lamp with a brick shape in accordance with the present invention.

With reference to FIG. 8, the two openings (161) are defined in a pervious to light plate (16a) to retain two solar batteries (121). The pervious to light plate (16a) covers the opening (151) in the casing (15).

Therefore, the lamp is brick shaped to be easily used in walls or floors. The lamp has a solar battery and rechargeable battery to store DC power from solar energy, so that the lamp does not need to be connected to external power. The lamp with the control circuit is able to automatically turn on in a dark place so the lamp lights up when night falls.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A decorative lamp comprising a casing, a control circuit and a light source where the casing has a pervious to light plate to mount the control circuit and light source with the light source facing the pervious to light plate, wherein the control circuit comprises:

a power unit having at least one solar battery and at least one rechargeable battery, wherein the power unit converts solar energy to a charge current to charge the rechargeable battery;

a light detecting unit connected to the power unit to detect changes in ambient light around the casing, wherein the light detecting unit outputs a different voltage depending on the intensity of the ambient light; and a signal amplifier unit having an input terminal and an output terminal connected through to an electronic switch to light source, wherein the signal amplifier controls the electronic switch to turn on or turn off the light source.

2. The decorative lamp as claimed in claim 1, wherein the light detecting unit is a voltage divider that is a resistor and a photo-resistor connected in series, and the signal amplifier is a schmitt trigger composed of two PNP transistors.

3. The decorative lamp as claimed in claim 2, wherein the electronic switch is a NPN transistor connected to the output terminal of the signal amplifier.

4. The decorative lamp as claimed in claim 2, wherein the electronic switch is an oscillating electronic switch that causes the electronic switch to output an oscillating wave signal to cause the light source to light up.

5. The decorative lamp as claimed in claim 4, wherein the oscillator is a self-trigger oscillator.

6. The decorative lamp as claimed in claim 4, wherein the oscillator is an unstable oscillator.

7. The decorative lamp as claimed in claim 4, wherein the control circuit further comprises a voltage booster connecting the oscillating electronic switch with the light source.

8. The decorative lamp as claimed in claim 1, wherein the light source is composed of at least one LED.

9. The decorative lamp as claimed in claim 1, wherein the casing comprises a top face and four sides, wherein a top opening is defined in the top face.

10. The decorative lamp as claimed in claim 9, wherein an opening defined on one side of the casing is covered by the pervious to light plate and the top opening is covered by the solar battery.

11. The decorative lamp as claimed in claim 9, wherein at least one opening is defined in the pervious to light plate to mount the solar battery, wherein the pervious to light plate with the solar battery covers on the top opening of the casing.

* * * * *